April 17, 1928.
G. L. BRIDGE
1,666,679
COMBINED RADIATING AND CIRCULATING GAS HEATER
Filed Sept. 30, 1927
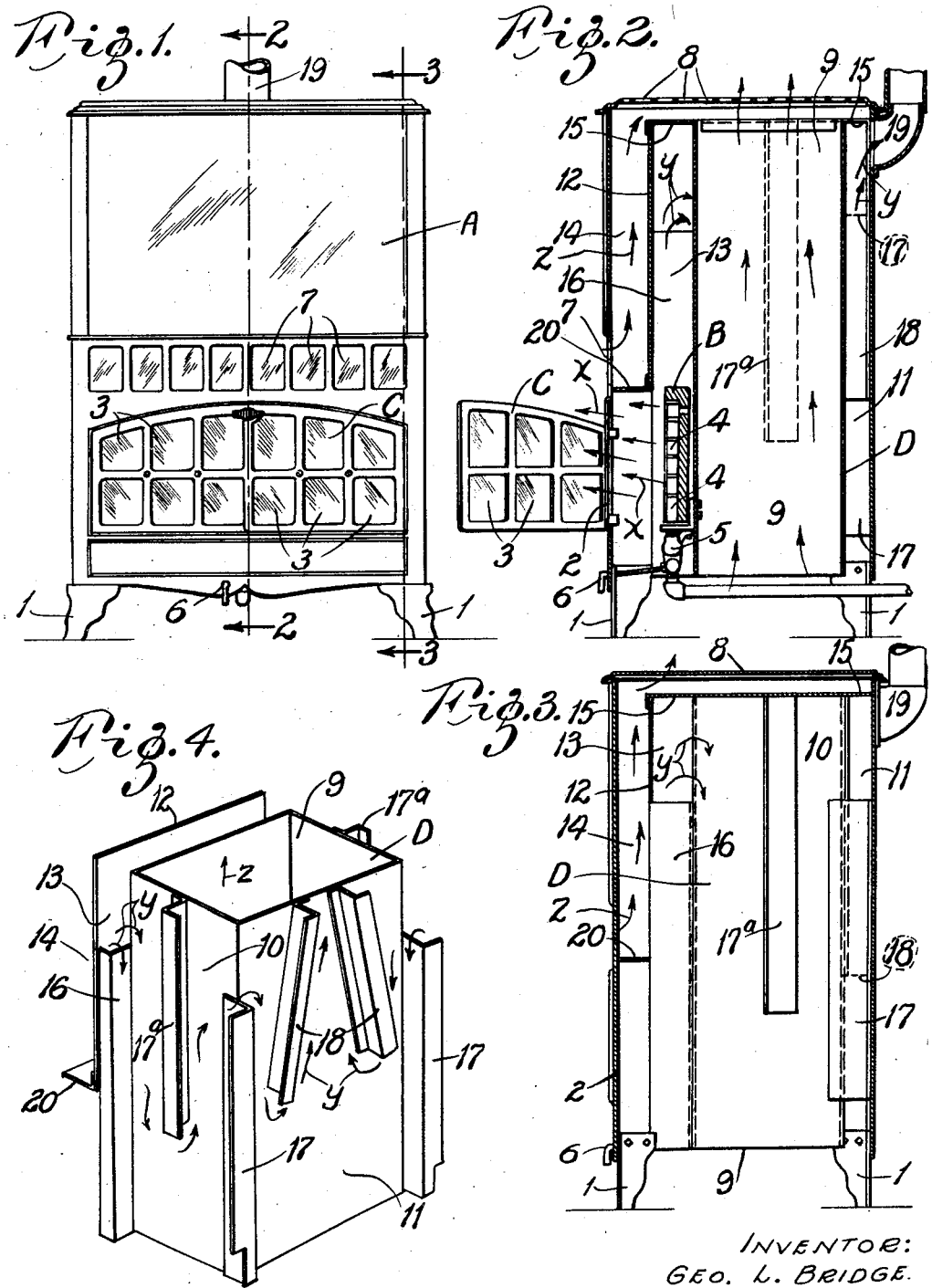
INVENTOR:
GEO. L. BRIDGE.
By Bakewell & Church
ATTORNEYS Patented Apr. 17, 1928.

1,666,679

UNITED STATES PATENT OFFICE.

GEORGE L. BRIDGE, OF CLAYTON, MISSOURI, ASSIGNOR TO BRIDGE & BEACH MANUFACTURING COMPANY, OF ST. LOUIS, MISSOURI, A CORPORATION OF MISSOURI.

COMBINED RADIATING AND CIRCULATING GAS HEATER.

Application filed September 30, 1927. Serial No. 223,033.

This invention relates to gas heaters, and has for its main object to provide a combined radiating and circulating gas heater that is exceptionally efficient, of attractive appearance and inexpensive to manufacture.

Briefly described, my improved heater consists of a heating unit, preferably of a kind that consists of one or more members constructed of refractory material and adapted to be maintained in an incandescent or highly heated condition by a flame or flames of gas, a casing inside of which said heating unit is arranged, a door or other suitable closure on said casing arranged so that when it is in its open position heat will radiate from said heating unit into the room in which the heater is located, and gas flues in said casing disposed so that when the heater is in operation, the products of combustion from said heating unit will flow through said flues in opposite directions or in substantially zig-zag paths, and thus supply heat to air which circulates upwardly through the casing to air discharge openings in the top of the casing, thereby producing a gas heater that combines the desirable features of a radiating heater and a circulating heater.

Figure 1 is a front elevational view of my improved heater.

Figure 2 is a vertical sectional view of said heater, taken on the line 2—2 of Figure 1, looking in the direction indicated by the arrows.

Figure 3 is a vertical sectional view of said heater, taken on the line 3—3 of Figure 1, looking in the direction indicated by the arrows; and Figure 4 is a perspective view of the structure that is arranged inside of the casing of the heater, so as to form the air flues and gas flues.

Referring to the drawings which illustrate the preferred form of my invention, A designates the casing of my improved heater, which is herein illustrated as being of rectangular shape in horizontal cross section and provided with legs 1 that rest upon the floor of the room or compartment in which the heater is used.

The front wall of said casing A is provided with an opening, designated by the reference character 2, that is arranged in alignment with or in close proximity to a heating unit B, and a closure C is provided for said opening 1. In the form of my invention herein illustrated the closure C consists of two doors hinged on the front wall of the casing A and provided with transparent material 3, so as to permit the glow from the heating unit B to be seen even when the doors C are closed. When said doors are open, as shown in Figure 2, heat will radiate forwardly through the door opening 2 in the front wall of the casing, as indicated by the arrows $x$. The heating unit B can be constructed in various ways without departing from the spirit of my invention, but it preferably consists of a slab of refractory material provided on its front side with radiants or radiating devices 4, and arranged above one or more gas burners 5 that can be controlled by a valve 6 arranged at any convenient point.

The front wall of the casing A is provided with air inlet ports 7 arranged preferably above the door opening 2 and the top of the casing is preferably constructed in the form of a removable grill or grating 8 equipped with air discharge openings up through which heated air will escape when the heater is in use. Inside of the casing A is an open-ended member D that extends vertically through the casing from the lower to the upper end of same, so as to form a main air flue 9. Said air flue member D is of substantially rectangular shape in horizontal cross section and it is arranged inside of the casing A in such a way as to form side gas flues 10 between the side walls of the casing A and the sides of the member D and a rear gas flue 11 between the rear wall of the casing and the rear side of the member D. A vertically-disposed partition 12 that extends transversely of the heater is interposed between the front wall of the casing A and the front side of the air flue member D at a point above the heating unit B, so as to form a front gas flue 13 that leads upwardly from the heating unit and an auxiliary air flue 14 that leads upwardly from the air inlets 7 in the front wall of the casing. The upper ends of the front gas flue, side gas flues and the rear gas flue are closed by a horizontally-disposed member 15 constructed in the form of an open, rectangular-shaped frame and arranged at the upper end of the main air flue member D preferably in such a way that it is free to become displaced or move upwardly, and thus vent the gas flues, in the event of an explosion in any of said flues.

The main air flue member D is provided on its exterior with laterally-projecting baffles that cause the products of combustion from the heating unit B to flow in reverse directions or to circulate in substantially zigzag paths through the gas flues, thereby insuring a relatively high degree of heat transfer to the walls of the air flues from which the circulating air absorbs heat. As shown in Figure 4, the member D is provided adjacent its front side with two baffle members 16 that project laterally from the sides of same towards the side walls of the casing A, the upper ends of same baffle members terminating below the top edge of the main air flue member D, so as to form passageways through which the gases can escape from the front gas flue 13 into the side gas flues 10, as indicated by the arrows y in Figures 2 and 3. Adjacent the rear end of the main air flue member D are similar baffle members 17, and intermediate the baffle members 16 and 17 are intermediate baffles 17ª disposed so as to cause the gases to reverse and flow in opposite directions in circulating through the side gas flues. On the rear side of the member D are baffle members 18 which are so disposed that the gases, after entering the rear gas flue 11 from the side gas flues 10, will flow downwardly and then converge and flow upwardly between said baffle members 18 into a gas outlet 19 at the upper end of the heater, as indicated by the arrows y. In order to prevent the radiant heat that escapes from the heating unit B from circulating upwardly into the auxiliary air flue 14 at the front side of the heater, a horizontally-disposed partition 20 is arranged transversely of the heater between the front wall of the casing A and the vertical partition 12, at a point below the air inlet openings 7 in the front wall of the casing.

When the heater is in operation air will circulate upwardly through the main air flue 9, and through the auxiliary air flue 14, as indicated by the arrows z, and after absorbing heat from the walls of said flues, will escape upwardly through the grating 8 that constitutes the top of the casing A, the walls of said air flues being maintained at a high temperature by the products of combustion which flow through the gas flues. When radiant heat is desired, the doors C of the heater can be opened, thus causing some of the heat from the heating unit B to radiate forwardly through the opening 2 in the front wall of the casing, as indicated by the arrows x, the products of combustion from the heating unit continuing to circulate through the gas flues and supply heat to the air which circulates constantly through the air flues.

The casing A can be of any preferred design and construction and the structure inside of said casing that forms the air and gas flues can be constructed and arranged in various ways without departing from the spirit of my invention. I prefer, however, to combine the main air flue member D with the partition members 12 and 20 and with the various baffle members, so as to form one unit that can be assembled and thereafter installed inside of the casing A, the main air flue member D being designed so as to form a central air circulating passageway of relatively great area that extends vertically through the casing of the heater from the lower to the upper end of same.

Having thus described my invention, what I claim as new and desire to secure by Letters Patent is:

1. A combined radiating and air circulating gas heater, comprising a casing provided in its top with air discharge openings, a gas operated heating unit arranged inside of said casing, an opening in the front wall of said casing through which radiant heat can escape, an open-ended air flue member of relatively great cross-sectional area arranged vertically in said casing in spaced relation to the side and rear walls of the casing so as to form a rear gas flue and side gas flues, a partition interposed between said air flue member and the front wall of the casing so as to form an auxiliary air flue and a front gas flue, and air inlets in the front wall of the casing for supplying air to said auxiliary air flue.

2. A combined radiating and air circulating gas heater, comprising a casing having a top provided with air discharge openings, a vertically-disposed member in said casing which forms a main flue up through which air circulates, gas flues at the front, rear and sides of said air flue member, a gas operated heating unit arranged in one of said gas flues, baffles on said air flue member arranged in said gas flues and disposed so as to cause the products of combustion from the heating unit to flow in reverse direction in circulating through said gas flues, an opening in the casing through which radiant heat can escape, and an auxiliary air flue leading from air inlets in one of the vertical walls of said casing through which air circulates to the discharge openings in the top of the casing.

3. A combined radiating and air circulating gas heater, comprising a casing of rectangular shape in horizontal cross section, provided with a top constructed in the form of a grill or grating, a gas operated heating unit arranged in said casing, an opening in the front wall of the casing in proximity to said heating unit through which radiant heat can escape, doors for closing said opening, an open-ended air flue member of rectangular shape in cross section arranged vertically in said casing and co-operating with the side walls and rear wall of the casing to form gas flues, a vertical, transversely-disposed partition interposed between the front wall of said casing and the front side of said air flue member to form an auxiliary air flue and a front gas flue, a closure for the upper ends of said gas flues, baffles in said gas flues disposed so as to cause the gases to circulate through said flues in zig-zag paths, and means for admitting air to the lower end of said auxiliary air flue.

GEORGE L. BRIDGE.